(12) United States Patent
Olson

(10) Patent No.: US 7,927,077 B2
(45) Date of Patent: Apr. 19, 2011

(54) WIND BLADE SPAR CAP LAMINATE REPAIR

(75) Inventor: Steven Olson, Greer, SC (US)

(73) Assignee: General Electric Company, Schenectady, NY (US)

( * ) Notice: Subject to any disclaimer, the term of this patent is extended or adjusted under 35 U.S.C. 154(b) by 62 days.

(21) Appl. No.: 12/499,855

(22) Filed: Jul. 9, 2009

(65) Prior Publication Data
US 2010/0135820 A1 Jun. 3, 2010

(51) Int. Cl.
*F01D 5/14* (2006.01)
(52) U.S. Cl. .................. 416/229 R; 156/94; 156/98
(58) Field of Classification Search ............ 416/229 R, 416/236; 156/94, 98
See application file for complete search history.

(56) References Cited

U.S. PATENT DOCUMENTS

| 6,206,067 | B1 | 3/2001 | Kociemba et al. |
| 6,761,783 | B2 * | 7/2004 | Keller et al. ............... 156/94 |
| 2010/0047541 | A1 * | 2/2010 | Care ........................ 428/212 |

OTHER PUBLICATIONS

Wang, et al., On the design methodology of scarf repairs to composite laminates, Composites Science and Technology 68 (2008) pp. 35-46, ScienceDirect, Crown Copyright 2007 Published by Elsevier Ltd.
Repair of Components, 2000, pp. 3-1 to 3-6, Part 2; Chapter 1; Section 3, Germanischer Lloyd.
Composite Repair, Hexcel Composites, Apr. 1999, pp. 1-13, Publication No. UTC 102, Hexcel Composites, Duxford.
Lekou, D.J. & Van Wingerde, A.M., Repair Techniques for Composite Materials Applicable to WT Blades, 27th Risoe International Symposium on material Science, Polymer Composite Materials for Wind Power Turbines, 20 pages, Kane Cres, Knowledge Centre WMC.
Ahn, Sung-Hoon & Springer, George S., Repair of Composite Laminates, U.S. Department of Transportation, Federal Aviation Administration, DOT/FAA/AR-00/46, Final Report, Dec. 2000, National Technical Information Service; Applicable pp. 1-19; http://ntl.bts.gov/lib/17000/17600/17631/PB2001102638.pdf.
Marine Composites, 2nd Edition, pp. 285, 286, 289, 292, 295 and 296, Eric Green Associates, Inc., 1999, ISBN 0-9673692-0-7; http://www.ericgreeneassociates.com/images/MARINE_COMPOSITES.pdf.

* cited by examiner

*Primary Examiner* — Edward Look
*Assistant Examiner* — Dwayne J White
(74) *Attorney, Agent, or Firm* — McNees Wallace & Nurick LLC

(57) ABSTRACT

A wind blade spar cap laminate repair for wind turbine rotor blades, a repair kit to repair spar cap laminate damage, and a method of repairing damage on wind turbine rotor blades is provided. The wind blade spar cap laminate repair includes a prepared surface, an adhesive region disposed on the prepared surface, and a repair disposed on the adhesive region, wherein the adhesive region sufficiently bonds the repair to the prepared surface to substantially match the mechanical properties of the bulk of the wind turbine rotor blade.

18 Claims, 4 Drawing Sheets

US 7,927,077 B2

WIND BLADE SPAR CAP LAMINATE REPAIR

FIELD

The present disclosure is directed to a wind turbine rotor blade spar cap laminate repair, a repair kit to repair spar cap laminate damage, and a method of repairing damage on wind turbine rotor blade spar cap laminates.

BACKGROUND

Wind turbines have received increased attention as environmentally safe and relatively inexpensive alternative energy sources. With this growing interest, considerable efforts have been made to develop wind turbines that are reliable and efficient.

Generally, a wind turbine includes a rotor having multiple blades. The rotor is mounted to a housing or nacelle, which is positioned on top of a truss or tubular tower. Utility grade wind turbines (i.e., wind turbines designed to provide electrical power to a utility grid) can have large rotors (e.g., 30 or more meters in length) and generally have an average wind turbine rotor blade size of 24 meters to 47 meters in length (80-155 feet). In addition, the wind turbines are typically mounted on towers that are at least 60 meters in height. Blades on these rotors transform wind energy into a rotational torque or force that drives one or more generators. Wind turbine rotor blade designs have become increasingly complex to maximize aerodynamic properties and to withstand a variety of environments and conditions.

A wind turbine cannot generate electricity without the wind turbine rotor blades. Currently, if certain material failures occur in the wind turbine rotor blade, the wind turbine must be taken off-line and the wind turbine rotor blade must be replaced. The costs and time associated with transportation of replacement blades and the installation of the replacement blades is very high.

Generally, wind turbine rotor blades are fabricated from composite fiber materials and matrices, and have a twenty-year service life. Current fabrication methods used to produce wind turbine rotor blades are time and labor intensive and require special fabrication methods and facilities, as such, fabrication of wind turbine rotor blades is difficult and expensive. The process for producing wind turbine rotor blades is time and labor intensive and usually done using a hand lay-up technique to form the composite-laminate blade structure. As a result of this time and labor intensive process, any inattention to detail during the manufacturing and lay-up process to produce the wind turbine rotor blade can result in defects in the spar cap. Furthermore, the fabrication process of wind turbine rotor blades can lead to small defects in the wind turbine rotor blades that can result in increased risk of failure of the wind turbine rotor blade that results in the entire blade needing to be replaced. As such, the replacement of a blade or multiple blades on a wind turbine is an expensive endeavor.

What is needed is a wind turbine rotor blade spar cap laminate repair that is capable of being partially or fully assembled on location which reduces or eliminates transportation costs associated with turbine rotor blade replacement. What is also needed is a repair system that substantially matches the mechanical properties of the bulk of the wind turbine rotor blade, instead of replacing the entire wind turbine rotor blade once damage is found. Additional needs include, a wind turbine rotor blade spar cap laminate repair that can be applied in various blade orientations, including a horizontal position, on the ground detached from the wind turbine, or in vertical position, attached to the wind turbine rotor.

SUMMARY OF THE DISCLOSURE

One aspect of the present disclosure includes a patched wind turbine rotor blade comprising a prepared surface, an adhesive region disposed on the prepared surface, and a repair disposed on the adhesive region, wherein the adhesive region sufficiently bonds the repair to the prepared surface to substantially match the mechanical properties of the bulk of the turbine rotor blade.

Another aspect of the present disclosure includes a method of repairing damage on wind turbine rotor blades, which comprises preparing a surface on the wind turbine rotor blade, applying an adhesive region to the prepared surface, and applying a repair to the adhesive region, wherein the adhesive region sufficiently bonds the repair to the prepared surface to substantially match the mechanical properties of the bulk of the blade.

Still another aspect of the present disclosure includes a kit for repairing damage to a wind turbine rotor blade comprising an adhesive layer fiber material, an adhesive layer matrix material, a repair layer fiber material, and a repair layer matrix material.

One advantage of the present disclosure is to provide a repair that matches the mechanical properties of the bulk of the turbine blade, wherein replacement of the entire blade, once damage to the spar cap laminate of the turbine blade is discovered, is not required, resulting in cost savings and increasing the useful life of the wind turbine rotor blade.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION

Figure 1:
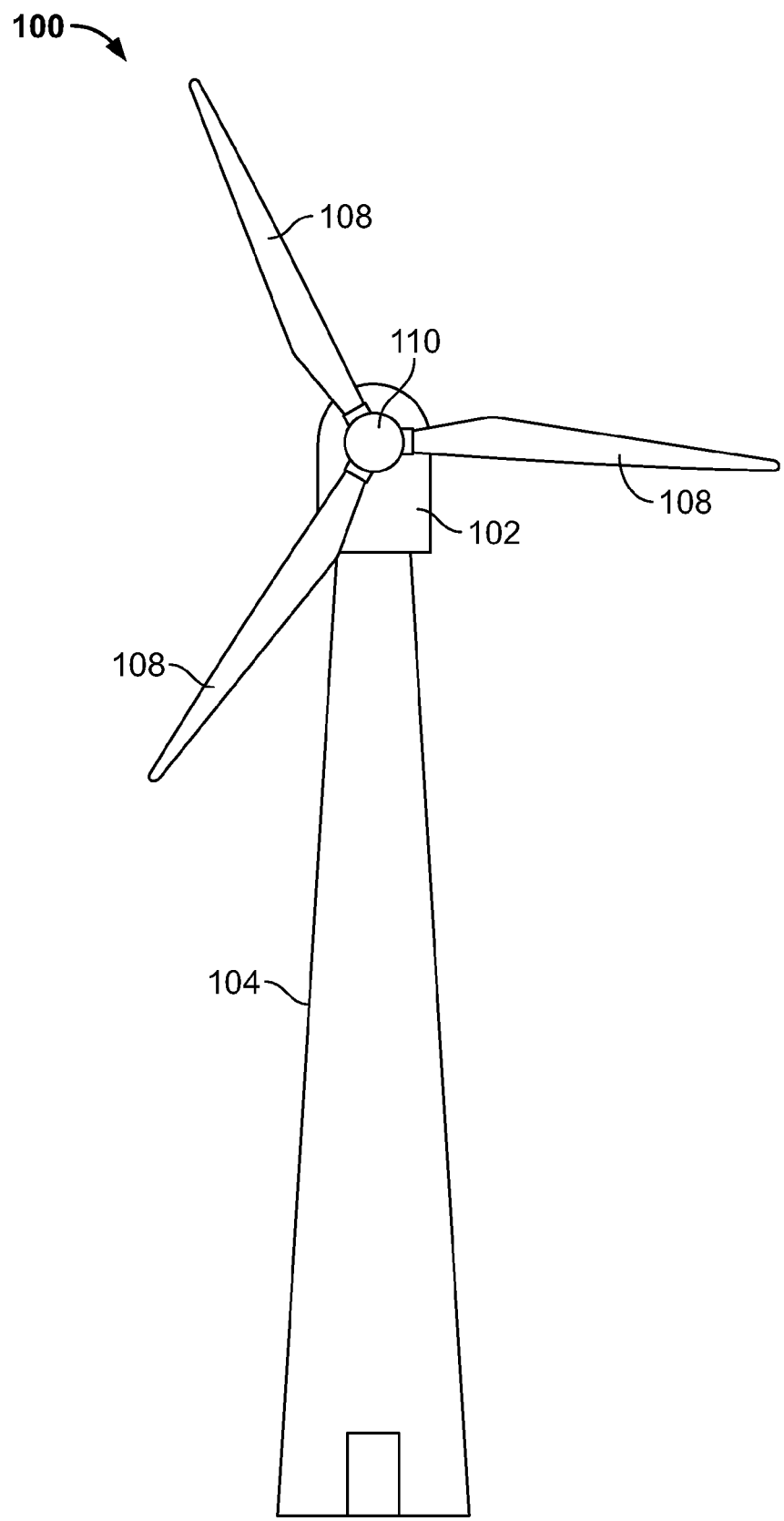
FIG. 1 is a front view of a wind turbine according to an embodiment of the present disclosure.

As shown in FIG. 1, a wind turbine 100 generally comprises a nacelle 102 housing a generator (not shown). Nacelle 102 is a housing mounted atop a tower 104. The wind turbine 100 may be installed on any terrain providing access to areas having desirable wind conditions. The terrain may vary greatly and may include, but is not limited to, mountainous terrain or off-shore locations. Wind turbine 100 also comprises a rotor that includes one or more wind turbine rotor blades 108 attached to a rotating hub 110.

Figure 2:
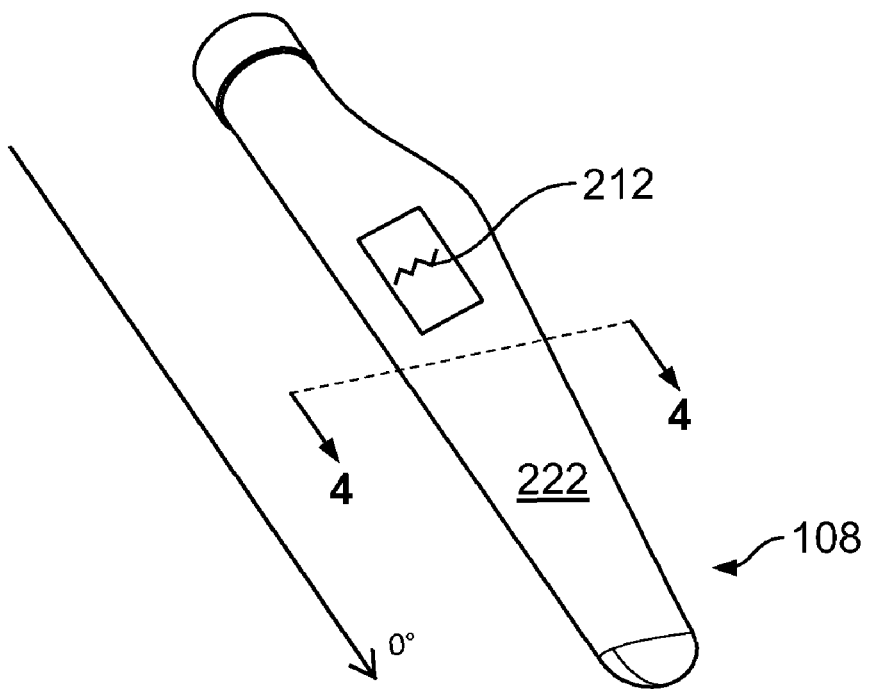
FIG. 2 is a perspective view of a wind turbine rotor blade having spar cap damage.

FIG. 2 shows damage 212 to a spar cap laminate 222 of wind turbine rotor blade 108. Spar cap laminate 222 further includes a plurality plies of composite fabric fibers laid up and cured in a matrix to form the composite part. Damage 212 may include imperfections or defects from any number of typical composite failures, for example, such as, cracking, waves, and delamination. Currently, when wind damage 212 is discovered to spar cap laminate 222, wind turbine rotor blade 108 cannot be repaired. As such, if a wind turbine rotor blade 108 is damaged it must be replaced with a new turbine blade, usually at a great cost and well before the end of the twenty-year service life period.

Figure 3:
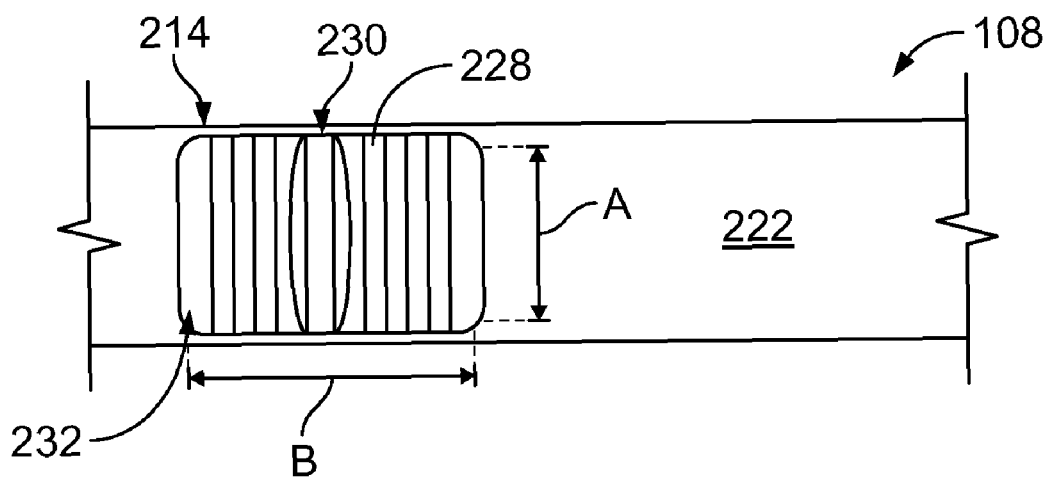
FIG. 3 is a top view of the wind turbine rotor blade depicting the prepared surface to receive a patch according to an embodiment of the present disclosure.

FIG. 3 is a top view of wind turbine rotor blade 108 showing prepared surface 214 of spar cap 222. Prepared surface 214 further comprises a repair area 232 and an area 230 scarfed to receive a repair patch 210. Repair area 232, as utilized herein, is the total area that covered by repair 216. Scarf area 230, as utilized herein, is the area that is removed or scarfed from the original spar cap laminate 222. Scarfing, as utilized herein, is defined as taper sanding or any other process in which composite material surfaces may be selectively removed. Any number of methods can be used to scarf the area to be repaired, for example, such as grit wheels, sand paper, or grinding. In one embodiment, repair area 232 is scarfed with a grit wheel to grind out each ply of spar cap laminate 222. This grinding is done from the center out and down to the first ply of spar cap laminate 222. Alternatively, the grinding can be through the first ply, so that a small cut-out or hole is formed in spar cap laminate 222. Next, using the proper tooling, a preselected distance on each side of the first layer of spar cap laminate 222 is stepped out from the center of the first ply of spar cap laminate 222. The stepping distance 228 will depend on the thickness and number of plies in spar cap laminate 222. While not so limited, stepping distance 228 on each side may be from about 25 millimeters to about 50 millimeters. Next, the grit wheel is used to grind up to or step out to the second ply of spar cap laminate 222 at a preselected distance from the center of the repair area 232 of first ply of spar cap laminate 222. The process of stepping out and grinding for each ply is repeated until all of the plies in spar cap laminate 222 are indentified, and a small area of each ply is ground out of spar cap laminate 222. After the steps 228 have been made in spar cap laminate 222, scarf area 230 and repair area 232 may be sanded with sandpaper to produce prepared surface 214. In one embodiment, 180-grit to 220-grit sandpaper is on scarf area 230 and repair area 232 to produce prepared surface 214. Scarf area 230 is shown as the width measurement A and the length measurement B (FIG. 3). Scarf area 230 is prepared using a predetermined scarf ratio or scarf joint. Scarf ratio or scarf joint, as utilized herein, is defined such that for every inch of laminate thickness of the original spar cap there are a number of inches of prepared surface 214 on each side from the center of the scarf area 230 for a total number of inches (shown in FIG. 3 as length (B)) per inch of thickness of the original spar cap laminate. In one embodiment, a scarf ratio of approximately 20:1 to approximately 70:1 may be used to provide prepared surface 214, alternatively a ratio of 40:1 to approximately 60:1 may be used to provide prepared surface 214, or a ratio 45:1 to 55:1 may be used to provide prepared surface 214. Scarf angle, as utilized herein, is defined as the angle (θ) that results from the use of a particular scarf ratio. According to an embodiment of this disclosure, a scarf angle (θ) of approximately 1.0° to approximately 3.5° may result, alternatively a scarf angle (θ) of approximately 1.0° to approximately 2.0° may result, or a scarf angle (θ) of approximately 1.0° to approximately 1.5° may result from the use of a particular scarf joint. According to another embodiment of this disclosure, a scarf angle (θ) of approximately 1.0° to approximately 1.5° may result from the use of a scarf ratio of approximately 45:1 to approximately 55:1 to arrive at the desired prepared surface 214.

Figure 4:
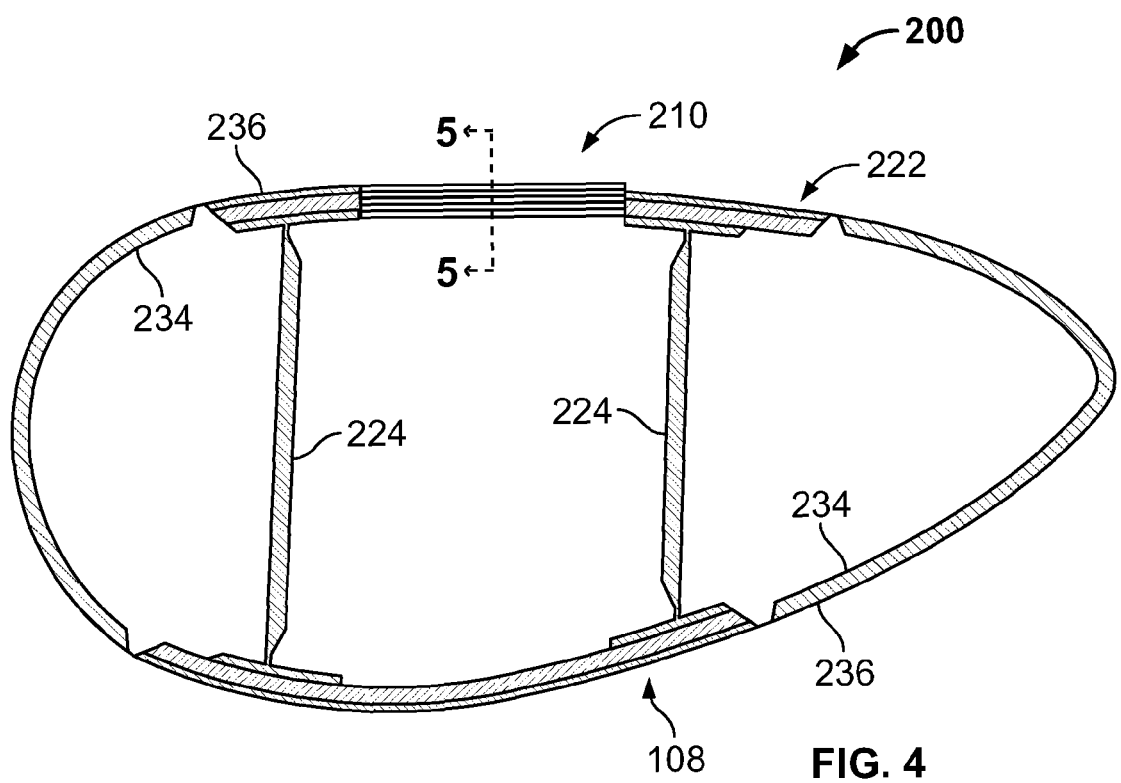
FIG. 4 is a sectional view of the spar cap of a wind blade of FIG. 2 taken in direction 4-4 showing a patch according to an embodiment of the present disclosure.

FIG. 4 is a sectional view in the 4-4 direction of FIG. 2. Wind turbine rotor blade 108 comprises spar cap laminate 222 and shear webs 224. Spar cap 222 comprises an interior surface 234 and an exterior surface 236. As shown in the figure, exterior surface 236 contains repair patch 210.

Figure 5:
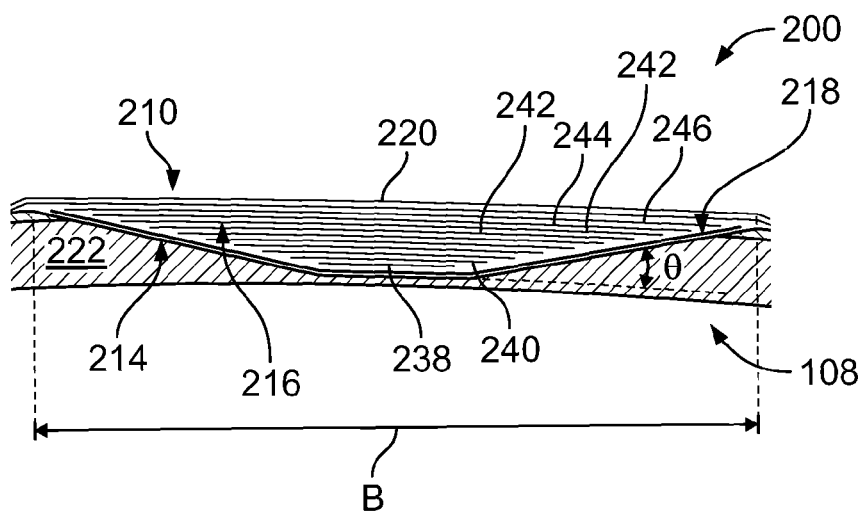
FIG. 5 is a sectional view in the 5-5 direction of the patched wind turbine rotor blade of FIG. 4 of the present disclosure.

FIG. 5 is a sectional view in the 5-5 direction of patched wind turbine rotor blade 200 of FIG. 4. Repair patch 210 is applied to spar cap laminate 222 of wind turbine rotor blade 108, and further includes prepared surface 214, an adhesive region 218 disposed on or adjacent to prepared surface 214, and a repair 216 disposed on or adjacent to adhesive region 218. Adhesive region 218 sufficiently bonds repair 216 to the prepared surface 214 to substantially match the mechanical properties of the bulk of the turbine blade 108. Repair patch 210 can further include a backing plate (not shown) of fiberglass, cardboard or sheet metal on the interior of the spar cap to assist in lay-up of adhesive region 218 on prepared surface 214. The backing plate is removed after installation of repair patch 210.

Adhesive region 218 is applied to at least a portion of the surface of prepared surface 214, lying parallel along the entire length (B) of the scarf area 230. In one embodiment, adhesive region 218 is applied to the entire surface of prepared surface 214. Adhesive region 218 further comprises at least one composite fabric ply and a matrix material. The application of the composite fabric material can include lay-up methods such as wet-layup or pre-impregnated (pre-preg) lay-up. The matrix material may be applied to the composite fabric by pre-injection into the fabric layer (e.g., pre-preg fabric) or by brushing or rolling the matrix onto the surface of the fabric layer until the matrix material is absorbed. Suitable composite fabrics include, but are not limited to a fiberglass fabric or a carbon fiber fabric, for example, such as, E-fiberglass, S-fiberglass, carbon/E-glass hybrids, and carbon fibers. Suitable matrix materials include, but are not limited to, polyester, polyvinyl, epoxy or any other matrix suitable for formation of composite material. The fibers of the at least one ply of composite fabric of adhesive region 218 have an orientation that is unidirectional (0°) or biaxial (+45°/−45°). In another embodiment, the fibers of the at least one ply of composite fabric of adhesive region 218 are a chopped or continuous strand mat.

Repair 216 is disposed on adhesive region 218 and further comprises a laminate layer. Repair 216 is butted-up against the surface of prepared area 214 on top of adhesive region 218. Laminate layer of repair 216 further comprises a plurality of composite fabric plies 238, 240, 242, 244 and a matrix material. The matrix material is applied to the composite fabric plies by pre-injection (e.g., pre-preg) or brushing or rolling the matrix material onto the surface of the fabric layer. Suitable composite fabrics for the composite fabric plies 238, 240, 242, 244 include, but are not limited to a fiberglass fabric or a carbon fiber fabric, for example, such as E-fiberglass, S-fiberglass, carbon/E-glass hybrids, and carbon fibers. Suitable matrix materials include, but are not limited to, polyester, polyvinyl, epoxy or any other matrix suitable for formation of composite material. The fiber orientation of the fibers in the composite fabric plies 238, 240, 242, 244 of repair 216 may be unidirectional, making the orientation of the plies in the composite fabric of repair 216 substantially parallel to the orientation of the unidirectional plies of the original spar cap laminate 222.

In one embodiment, the plurality of plies 238, 240, 242, 244 of laminate layer of repair 216 have a rectangular shape and all have a dimensional measurement that is approximately the same measurement, namely sides that correspond to approximately the width (A) of scarf area 230. These equal sides of plies 238, 240, 242, 244 of laminate layer of repair 216 are laid parallel to the width (A) of scarf area 230. The process for applying the plurality of plies 238, 240, 242, 244 of laminate layer of repair 216 starts by applying a first ply 238 to adhesive region 218. First ply 238 is applied to and butts-up against a portion of adhesive region 218, allowing the fibers of first ply 238 to be substantially parallel to the plies and fibers of spar cap laminate 222. First ply 238 of repair 216 has a predetermined size which corresponds to an area equal to or slightly greater than the size of the area created by grinding or cutting out an area to the first ply of spar cap laminate 222. For example, the width of first ply 238 may be approximately 25 millimeters to 50 millimeters, which is placed in the center of scarf area 230 on top of and butted-up to adhesive region 218 which covers the exposed plies of spar cap laminate 222, and the length of first ply 238 will correspond to the width (A) of scarf area 230. Second ply 240 of repair 216 has a slightly longer width on each side than first ply 238 of repair 216. For example, second ply 240 may be approximately 25 mm to 50 mm longer on each side for a total width of from approximately 50 mm to 100 mm more than first ply 238 of repair 216. Second ply 240 is applied to first ply 238, and also butts-up against adhesive region 218, allowing the fibers of second ply 240 to be substantially parallel to the fibers of spar cap laminate 222. A plurality of intermediate plies 242 is applied to second ply 238, wherein each successive intermediate ply 242 has approximately the same dimensional measurement in the "A" direction (shown in FIG. 3) as first ply 238 and second ply 240 and is a predetermined size greater on each side than the previous ply layer in the "B" direction (shown in FIG. 3 and FIG. 5). For example, each intermediate ply 242 may be from approximately 25 mm to 50 mm greater in dimension than the preceding ply layer in the "B" direction. Each intermediate ply 242 is applied to the previous ply layer and butts-up against or otherwise contacts adhesive region 218, allowing the fibers of each intermediate ply 242 to be substantially parallel to the corresponding plies and fibers of spar cap laminate 222. The process of laying intermediate plies 242 of increasing size is repeated until the final ply layer 244 of repair 216 substantially covers prepared area 214. The number of intermediate plies 242 used for repair 216 depends on the thickness of the ply layers used in spar laminate cap 222. Final ply 244 is applied to the last intermediate ply 242 and butts-up against adhesive region 218 to allow fibers of final laminate layer 244 to be substantially parallel to the plies and fibers of spar cap laminate 222.

The butted-up layup of repair 216 creates micro-loaded areas along the edges of the prepared surface 214, which in turn creates micro-stress concentration in the repair patch 210. The adhesive region 218 reduces the micro-stresses in the repair patch 210. While not wishing to be bound by theory, it is believed the structure and placement of adhesive region 218 distributes the micro-stress concentrations of repair patch 210 and joins repair 216 to prepared surface 214 to provide greater than about 93% to approximately 100% or greater of full tensile strength and stiffness for patched wind turbine rotor blade 200, compared to the mechanical properties of wind turbine rotor blade 108 as originally fabricated. The tensile strength and stiffness of each wind turbine rotor blade varies and depends on the specific wind turbine rotor blade design, the wind turbine the wind turbine rotor blade is attached to, the specific location point on the wind turbine rotor blade, and International Electrotechnical Commission (IEC) class. In an exemplary embodiment, a Tecsis 34a blade may be repaired. A Tecsis 34a blade is typically suitable to be attached to a 1.5 MW turbine, and may have an original stiffness of 30.3 gigapascal (GPa) (4.5 million psi) and a tensile strength of 366.6 MPa (53,170 psi).

In one embodiment, a reinforcing layer 246 is disposed on the repair 216 to provide greater than 100% translation of tensile strength and stiffness to the patched wind turbine rotor blade 200. Reinforcing layer 246 comprises at least one composite fabric ply and a matrix material, wherein the matrix material is applied to the at least one composite fabric ply by pre-injection (e.g., pre-preg) or brushing or rolling the matrix material onto the surface of the fabric layer. Suitable composite fabrics include, but are not limited to, a fiberglass fabric or a carbon fiber fabric, for example, such as E-fiberglass, S-fiberglass, carbon/E-glass hybrids, and carbon fibers. Suitable matrix materials include, but are not limited to, polyester, polyvinyl, epoxy or any other matrix suitable for formation of composite material. Reinforcing layer 246 is applied to final ply 244 of repair 216. Reinforcing layer 246 has approximately the same dimensional measurement as plurality of plies 238, 240, 242, 244 of laminate layer of repair 216 in the "A" direction and has approximately the same or greater dimensional measurement in the "B" direction as final ply 244 of repair 216. The fiber orientation of the fibers in the composite fabric of reinforcing layer 246 is unidirectional, making the orientation of the plies and fibers in the composite fabric of reinforcing layer 246 substantially parallel to the orientation of the unidirectional plies and fibers of original spar cap laminate 222. In the present embodiment, two layers of composite fabric plies are used for reinforcing layer 246 and disposed on repair 216, but fewer or more layers of composite fabric plies can be used.

In yet another embodiment, an optional sealing layer 220 is added to repair patch 210 for additional stiffness and tensile strength. Sealing layer 220 is applied over repair 216 or applied over reinforcing layer 246 on spar cap laminate 222. Sealing layer 220 comprises at least one composite fabric ply layer and a matrix material, wherein the matrix material is applied to the at least one composite fabric ply by pre-injection (e.g. pre-preg) or brushing or rolling the matrix material onto the surface of the fabric layer. Suitable composite fabrics include, but are not limited to, a fiberglass fabric or a carbon fiber fabric, for example, such as E-fiberglass, S-fiberglass, and carbon/E-glass hybrids. Suitable matrix materials include, but are not limited to, polyester, polyvinyl, epoxy or any other matrix suitable for formation of composite material. The orientation of the fibers in the composite fabric ply of sealing layer 220 is a biaxial (+45°/−45°) orientation, making the orientation of the plies of sealing layer 220 substantially parallel to the orientation of the plies of original spar cap laminate 222. Sealing layer 220 is applied to match the original laminate schedule of the spar cap laminate 222. In one embodiment, sealing layer 220 has approximately the same length and width as repair area 232. In another embodiment, sealing layer 220 has a length and width that is slightly greater than that of repair area 232.

A polyurethane coating may be applied to further stabilize and seal patched wind turbine rotor blade 200. In one embodiment, sealing layer 220 is applied to repair 216, or applied to reinforcing layer 246 covering repair 216. In yet another embodiment, the polyurethane coating is applied to sealing layer 220.

The matrix material of the described layers may be cured by any suitable technique know for curing matrix materials.

For example, suitable curing techniques may include exposure to infrared radiation, ultraviolet radiation, or heat or other curing method. The matrix material can be cured in stages or cured all at once. In another embodiment, the matrix material may be permitted to remain on the surface to receive additional layers.

In one embodiment, repair patch 210 is applied to spar cap laminate 222 while in a vertical position, where the wind turbine rotor blade 108 is still attached to the rotating hub 110. In another embodiment, repair patch 210 is applied to spar cap laminate 222 while in a horizontal position, where wind turbine rotor blade 108 has been removed from rotating hub 110 and placed on the ground or a work surface. When applying repair patch 210 in the vertical position it is best that the matrix material is cured in stages, instead of curing after all the layers have been applied. No particular method is necessary when applying repair patch 210 while wind turbine rotor blade 108 is in a horizontal position.

While the above has been shown and described with respect to a method and system for repair of spar cap 222 of wind turbine rotor blade 108, the disclosure is not so limited. Any portion of wind turbine rotor blade 108 composed of composite material may be repaired by the method and system of the present disclosure.

Figure 6:
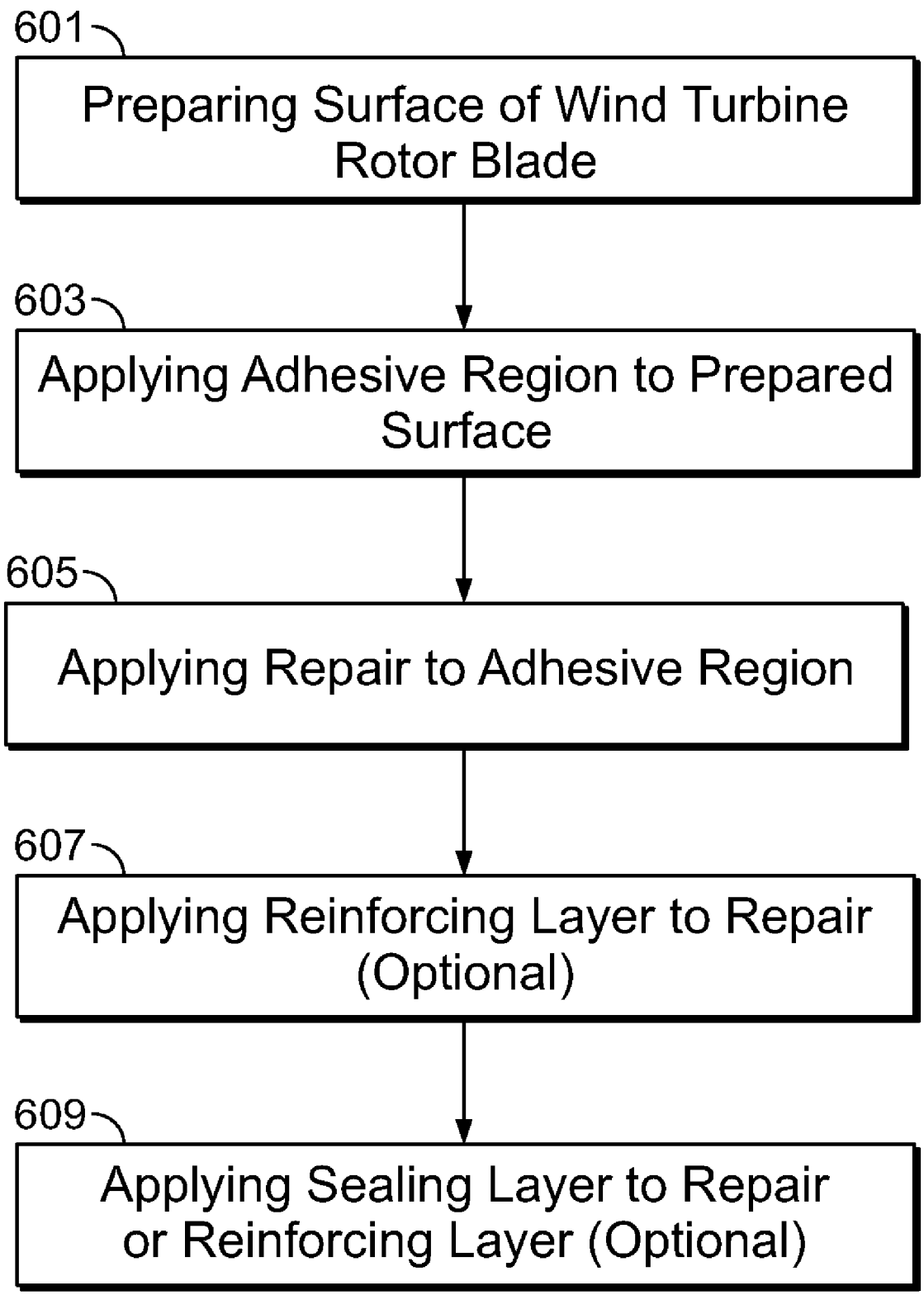
FIG. 6 is a flow chart of the method of the repair of the present disclosure.

As shown in FIG. 6, a method of repairing damage 212 on wind turbine rotor blades 108 is provided. The method includes preparing a surface 214 on wind turbine rotor blade 108 (box 601), applying adhesive region 218 to prepared surface 214 (box 603), and applying repair 216 to adhesive region 218, wherein adhesive region 218 sufficiently bonds repair 216 to prepared surface 214 to substantially match the mechanical properties of the bulk of blade 108 (box 605). The method of the present disclosure can be performed on wind turbine rotor blade 108 while attached to rotating hub 110 of wind turbine 100, or when wind turbine rotor blade 108 has been detached and removed. Further, the method may be performed at any orientation or configuration of wind turbine rotor blade 108 that permits access to the damaged surface.

In another embodiment, sealing layer 220 is applied to repair 216 (box 609). In yet another embodiment, reinforcing layer 246 is disposed on repair 216 to provide over 100% translation of tensile strength and stiffness to patched wind turbine rotor blade 200 (box 607). Next, sealing layer 220 may be applied to reinforcing layer 246 disposed on repair 216 (box 609). A layer of polyurethane may be added to sealing layer 220, and the layers are cured using a heat source.

The present disclosure also provides a kit for repairing damage 212 to a wind turbine rotor blade 108 comprising an adhesive layer fiber material, an adhesive layer matrix material, a repair layer fiber material, and a repair layer matrix material (not shown in the figures). The adhesive layer fiber material can be any suitable composite fabrics such as, but not limited to, a fiberglass fabric or a carbon fiber fabric, for example, such as E-fiberglass, S-fiberglass, and carbon/E-glass hybrids. Suitable adhesive layer matrix materials include, but are not limited to, polyester, polyvinyl, epoxy or any other matrix suitable for formation of composite material. In one embodiment, the adhesive layer fabric material and adhesive layer matrix material may be combined as a pre-impregnated composite material. The repair layer fiber material can be any suitable composite fabrics such as, but not limited to, a fiberglass fabric or a carbon fiber fabric, for example, such as E-fiberglass, S-fiberglass, and carbon/E-glass hybrids. Suitable repair layer matrix materials include, but are not limited to, polyester, polyvinyl, epoxy or any other matrix suitable for formation of composite material. In one embodiment, of the kit the repair layer fabric material can be cut to a predetermined length. In another embodiment, of the kit the repair layer fabric material and repair layer matrix material may be combined as a pre-impregnated composite material.

The kit may further include a sealing layer fiber material, a sealing layer matrix material, a reinforcing layer fiber material, a reinforcing layer matrix material, and/or a polyurethane paint. Any suitable composite fabrics such as, but not limited to, a fiberglass fabric or a carbon fiber fabric, for example, such as E-fiberglass, S-fiberglass, and carbon/E-glass hybrids, can be used for the sealing layer fiber material and the reinforcing layer fiber material. Suitable matrix materials for the sealing layer material and the reinforcing layer matrix material include, but are not limited to, polyester, polyvinyl, epoxy or any other matrix suitable for formation of composite material. The polyurethane paint can be any commercially available polyurethane paint.

EXAMPLES

Tescis 34a blade segments were prepared to determine the tensile stiffness and strength of the present disclosure relative to an unrepaired original spar cap laminate, spar cap laminate with predominately parallel plies, and a spar cap laminate with only butted plies.

In Comparative Example 1, an undamaged original Tecsis 34a blade segment having an original spar cap laminate schedule is provided. The original spar cap laminate schedule consists of 20 plies of unidirectional composite fabric with matrix material and two additional plies having biaxial orientation laid up and cured to form the original spar cap laminate schedule.

The composite fabric cloth used in the examples consists of PPG fiberglass roving, woven together into a stitched unidirectional fabric by Saertex USA (Huntersville, N.C.). The matrix material used the examples is an epoxy resin and hardener supplied by Hexion Specialty Chemicals (Columbus, Ohio).

In Comparative Example 2, a damaged and repaired Tecsis 34a blade segment is provided. In this example, the damaged surface is prepared by machining out the cracked laminate and then scarfing the joint. The damage is repaired by laying-up 20 unidirectional plies of composite fabric with a matrix material butted-up against the scarf joint area, such that the butted-up plies of the repair match the original ply and fiber orientation of the original spar cap laminate. An additional two plies of biaxial composite fabric with matrix material are laid-up on the 20 butted-up plies to also match the original spar cap laminate schedule. The butted-up layers and matrix material and biaxial plies and matrix material are then cured to form the spar cap laminate repair of Comparative Example 2.

In Comparative Example 3, a damaged and repaired Tecsis 34a blade segment is provided. In this example, the damaged surface is prepared by machining out the cracked laminate and then scarfing the joint. The damage is repaired by laying-up 20 plies of unidirectional composite fabric with a matrix material parallel along the scarf joint. The plies of the composite fabric material cover the entire scarf area and are not the same as the original spar cap laminate schedule. An additional two plies of biaxial composite fabric with matrix material are laid-up on the 18 parallel plies and matrix material. The parallel layer and matrix material and biaxial plies and matrix material are then cured to form the spar cap laminate repair of Comparative Example 3.

In Example 1, a damaged and repaired Tecsis 34a blade segment is provided. In this example, the damaged surface is prepared by machining out the cracked laminate and then scarfing the joint and sanding. The damage is repaired by laying up an adhesive layer, comprised of a single composite fabric ply and matrix material, parallel along the entire surface of the scarf area. The fiber orientation of adhesive layer can be unidirectional, biaxial or a chopped or continuous strand mat but the fiber orientation for Example 1 is unidirectional. A repair is then disposed on adhesive layer. The repair comprises a laminate layer which further comprises a plurality of unidirectional composite fabric plies and a matrix material. Each ply of the repair is laid such that a portion is butted-up against the adhesive layer. The fibers of each unidirectional ply of repair are substantially parallel to the plies and fibers of the original spar cap laminate schedule. Repair consists of 19 unidirectional plies laid butted-up against the adhesive layer with a matrix material. In addition to the adhesive layer and repair, two additional layers of biaxial composite fabric and matrix material are added to the repair. The composite fabric and matrix material are then cured to form the spar cap laminate repair of an exemplary embodiment.

In Example 2, a damaged and repaired Tecsis 34a blade segment is provided. In this example, the blade segment is prepared like set forth above for Example 1. In addition to the adhesive layer and repair, an additional layer, a reinforcing layer, is added to the repaired blade segment before the final two biaxial layers are applied. In the present example, the reinforcing layer is comprised of two additional unidirectional composite fabric plies and a matrix material disposed on the repair. The reinforcing layer covers the repair and also covers a portion of the original undamaged spar cap laminate schedule. The final two layers of the biaxial composite fabric and matrix material are applied to the reinforcing layer. The blade segment is then cured to form the spar cap laminate repair of a second exemplary embodiment.

Table I provides relative tensile strength and stiffness properties for the various Tecsis 34a blade segments with respect to a new original (unrepaired and undamaged) spar cap laminate. Specifically, 100% tensile strength corresponds to 366.6 megapascals (MPa) (53,162 Psi) and 100% stiffness corresponds to 30.3 gigapascals (GPa) (4.4 Msi) for the test blade segments.

TABLE I

Properties of Wind Blade Spar Cap Laminate Repair

| Repair Type | Original laminate (Comparative Example 1) | Butted (Comparative Example 2) | Parallel (Comparative Example 3) | Repair Patch (Example 1) | Repair Patch with Reinforcing layer (Example 2) |
| --- | --- | --- | --- | --- | --- |
| Tensile Strength | 100% (366.6 MPa) | 85% (311.6 MPa) | 86% (315.3 MPa) | 100% (366.6 MPa) | 102% (373.9 MPa) |
| Stiffness | 100% (30.3 GPa) | 84% (25.4 GPa) | 84% (25.4 GPa) | 92% (27.9 GPa) | 103% (31.2 GPa) |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed:

1. A patched wind turbine rotor blade comprising,
   (a) a prepared surface, the prepared surface including a scarf area to remove damage from the wind turbine rotor blade, the scarf area including a plurality of stepped portions;
   (b) an adhesive region disposed on the prepared surface, wherein the adhesive region comprises at least one composite fabric ply and a matrix material, wherein the at least one fabric ply of the adhesive region is applied parallel over the entire length of the scarf area; and
   (c) a repair disposed on the adhesive region, wherein the adhesive region sufficiently bonds the repair to the prepared surface to substantially match the mechanical properties of the bulk of the turbine rotor blade.

2. The patched wind turbine rotor blade of claim 1, wherein the at least one composite fabric ply of the adhesive region comprises one of: fibers having a unidirectional orientation, fibers having a biaxial orientation, a chopped mat of fibers, or continuous strand mat of fibers.

3. The patched wind turbine rotor blade of claim 1, wherein the repair further comprises a laminate layer, wherein the laminate layer further includes a plurality of plies of composite fabric and a matrix material.

4. The patched wind turbine rotor blade of claim 3, wherein the plurality of plies of composite fabric of laminate layer are disposed in layers on the adhesive region and on the preceding ply of composite fabric of laminate layer, and wherein each of the plurality of plies of composite fabric of laminate layer butts-up to a portion of the adhesive region.

5. The patched wind turbine rotor blade of claim 4, wherein the composite fabric plies of the laminate layer include a plurality of fibers having a unidirectional orientation.

6. The patched wind turbine rotor blade of claim 5, wherein the orientation of the plurality of plies and the plurality of fibers of the laminate layer is substantially the same as that of the plurality of plies and the plurality of fibers of the existing spar cap laminate layer of the wind turbine rotor blade.

7. The patched wind turbine rotor blade of claim 1, wherein the wind turbine rotor blade further comprises a reinforcing layer disposed on the repair, wherein the reinforcing layer further includes at least one composite fabric ply and a matrix material.

8. The patched wind turbine rotor blade of claim 7, wherein the at least one composite fabric ply of reinforcing layer comprises fibers having a unidirectional orientation.

9. The patched wind turbine rotor blade of claim 8, wherein the reinforcing layer disposed on the repair and the adhesive layer provides greater than 100% translation of tensile strength and stiffness to the patched wind turbine rotor blade.

10. The patched wind turbine rotor blade of claim 7, wherein the wind turbine rotor blade further comprises a sealing layer disposed on the reinforcing layer, wherein the sealing layer comprises at least one composite fabric ply and a matrix material, and wherein the at least one composite fabric ply further includes fibers having a biaxial orientation.

11. The patched wind turbine rotor blade of claim 10, wherein the orientation of the plies and fibers of the sealing layer is substantially the same as that of plies and fibers of the existing spar cap laminate layer of wind turbine rotor blade.

12. The patched wind turbine rotor blade of claim 1, wherein the wind turbine rotor blade further comprises a sealing layer disposed on the repair, wherein the sealing layer comprises at least one composite fabric ply and a matrix material, and wherein the at least one composite fabric ply further includes fibers having a biaxial orientation.

13. The patched wind turbine rotor blade of claim 1, wherein the plurality of stepped portions have a stepping distance of approximately 25 millimeters to approximately 50 millimeters.

14. A method of repairing damage on wind turbine rotor blades, comprising:
 (a) preparing a surface on the wind turbine rotor blade, wherein preparing the surface includes removing damage from the wind turbine rotor blade to provide a scarf area, wherein the scarf area includes a plurality of stepped portions;
 (b) applying an adhesive region to the prepared surface, wherein the adhesive region comprises at least one composite fabric ply and a matrix material, wherein the at least one fabric ply of the adhesive region is applied parallel over the entire length of the scarf area; and
 (c) applying a repair to the adhesive region, wherein the adhesive region sufficiently bonds the repair to the prepared surface to substantially match the mechanical properties of the bulk of the blade.

15. The method of repairing damage on wind turbine rotor blades of claim 14, wherein the method further comprises applying a reinforcing layer to the repair.

16. The method of repairing damage on wind turbine rotor blades of claim 15, wherein the method further comprises applying a sealing layer the reinforcing layer disposed on the repair.

17. The method of repairing damage on wind turbine rotor blades of claim 16, wherein the method further comprises applying a layer of polyurethane paint to the sealing layer.

18. The method of claim 14, wherein the plurality of stepped portions have a stepping distance of approximately 25 millimeters to approximately 50 millimeters.

* * * * *